(12) United States Patent
Bapna et al.

(10) Patent No.: US 11,341,340 B2
(45) Date of Patent: May 24, 2022

(54) NEURAL MACHINE TRANSLATION ADAPTATION

(71) Applicant: Google LLC, Mountain View, CA (US)

(72) Inventors: Ankur Bapna, Sunnyvale, CA (US); Ye Tian, Santa Clara, CA (US); Orhan Firat, Mountain View, CA (US)

(73) Assignee: Google LLC, Mountain View, CA (US)

( * ) Notice: Subject to any disclaimer, the term of this patent is extended or adjusted under 35 U.S.C. 154(b) by 385 days.

(21) Appl. No.: 16/590,309

(22) Filed: Oct. 1, 2019

(65) Prior Publication Data
US 2021/0097144 A1    Apr. 1, 2021

(51) Int. Cl.
*G06F 40/58* (2020.01)
*G06F 17/16* (2006.01)
*G06K 9/62* (2022.01)

(52) U.S. Cl.
CPC .............. *G06F 40/58* (2020.01); *G06F 17/16* (2013.01); *G06K 9/6215* (2013.01)

(58) Field of Classification Search
CPC ...... G06F 16/951; G06F 17/16; G06F 40/154; G06F 40/242; G06F 40/247; G06F 40/263; G06F 40/295; G06F 40/30; G06F 40/42; G06F 40/44; G06F 40/45; G06F 40/47; G06F 40/56; G06F 40/58; G06F 16/24522; G06F 16/35; G06F 40/117; G06F 40/211; G06F 40/216; G06F 40/51; G06K 9/6215; G06N 3/08; G06N 20/00; G06N 3/006; G06N 3/04; G06N 3/0445; G06N 3/0454; G06N 3/0472; G10L 15/005; G10L 15/18; G10L 15/1815; G10L 15/197; G10L 13/00; A63F 13/213; G06Q 50/01; G16H 10/60
(Continued)

(56) References Cited

U.S. PATENT DOCUMENTS 5,467,425 A * 11/1995 Lau ........................ G10L 15/197
                                                    704/240
6,292,772 B1 * 9/2001 Kantrowitz ........... G06F 40/263
                                                        704/9
(Continued)

OTHER PUBLICATIONS

Bahdanau et al, "Neural Machine Translation by Jointly Learning to Align and Translate" arXiv, Apr. 2015, 15 pages.
(Continued)

*Primary Examiner* — Gerald Gauthier
(74) *Attorney, Agent, or Firm* — Fish & Richardson P.C.

(57) ABSTRACT

Adapters for neural machine translation systems. A method includes determining a set of similar n-grams that are similar to a source n-gram, and each similar n-gram and the source n-gram is in a first language; determining, for each n-gram in the set of similar n-grams, a target n-gram is a translation of the similar n-gram in the first language to the target n-gram in the second language; generating a source encoding of the source n-gram, and, for each target n-gram determined from the set of similar n-grams determined for the source n-gram, a target encoding of the target n-gram and a conditional source target memory that is an encoding of each of the target encodings; providing, as input to a first prediction model, the source encoding and the condition source target memory; and generating a predicted translation of the source n-gram from the first language to the second language.

19 Claims, 4 Drawing Sheets

(58) Field of Classification Search
USPC .............. 704/2, 4, 9, 243, 8; 707/706; 705/3
See application file for complete search history.

(56) References Cited

U.S. PATENT DOCUMENTS

| | | | | |
|---|---|---|---|---|
| 8,175,864 | B1* | 5/2012 | Dubiner | G06F 40/45 704/2 |
| 8,285,536 | B1* | 10/2012 | Kumar | G06F 40/42 704/2 |
| 8,504,353 | B2* | 8/2013 | Zaslavskiy | G06F 40/44 704/4 |
| 8,543,563 | B1* | 9/2013 | Nikoulina | G06F 40/42 707/706 |
| 8,600,728 | B2* | 12/2013 | Knight | G06F 40/154 704/2 |
| 8,660,836 | B2* | 2/2014 | Castelli | G06F 40/51 704/8 |
| 9,245,278 | B2* | 1/2016 | Orsini | G06Q 50/01 |
| 9,262,408 | B2* | 2/2016 | Tanaka | G06F 40/42 |
| 9,367,526 | B1* | 6/2016 | Vozila | G06F 16/3344 |
| 10,860,648 | B1* | 12/2020 | McCormick | G10L 15/005 |
| 10,902,221 | B1* | 1/2021 | Zhang | G06N 3/04 |
| 2007/0255550 | A1* | 11/2007 | Menezes | G06F 40/58 704/2 |
| 2008/0172378 | A1* | 7/2008 | Dolan | G06F 16/951 |
| 2008/0243472 | A1* | 10/2008 | DeGroot | G06F 40/58 704/2 |
| 2009/0192781 | A1* | 7/2009 | Bangalore | G06F 40/45 704/2 |
| 2010/0004920 | A1* | 1/2010 | Macherey | G06F 40/44 704/4 |
| 2012/0278060 | A1* | 11/2012 | Cancedda | G10L 15/06 704/2 |
| 2013/0006954 | A1* | 1/2013 | Nikoulina | G06F 40/44 707/706 |
| 2013/0117010 | A1* | 5/2013 | Hwang | G06F 40/56 704/2 |
| 2014/0136182 | A1* | 5/2014 | Bill | A63F 13/213 704/2 |
| 2014/0172407 | A1* | 6/2014 | Eden | G06F 40/42 704/2 |
| 2014/0330550 | A1* | 11/2014 | Bill | G06F 40/58 704/2 |
| 2014/0365242 | A1* | 12/2014 | Neff | G16H 10/60 707/756 |
| 2015/0213007 | A1* | 7/2015 | Liu | G06F 40/45 704/2 |
| 2015/0286634 | A1* | 10/2015 | Shin | G06F 40/30 704/2 |
| 2015/0347389 | A1* | 12/2015 | Lee | G06F 40/58 704/2 |
| 2016/0117316 | A1* | 4/2016 | Le | G06N 3/0454 704/9 |
| 2016/0350290 | A1* | 12/2016 | Fujiwara | G06N 20/00 |
| 2017/0060854 | A1* | 3/2017 | Zeng | G06F 40/55 |
| 2017/0177564 | A1* | 6/2017 | Rottmann | G06F 40/40 |
| 2017/0197152 | A1* | 7/2017 | Bojja | G06F 40/216 |
| 2017/0200076 | A1* | 7/2017 | Vinyals | G06N 3/0445 |
| 2017/0249383 | A1* | 8/2017 | Giverts | G06F 16/35 |
| 2017/0270100 | A1* | 9/2017 | Audhkhasi | G06F 40/30 |
| 2018/0075343 | A1* | 3/2018 | van den Oord | G06N 3/0454 |
| 2018/0089169 | A1* | 3/2018 | Yamauchi | G06F 40/247 |
| 2018/0260390 | A1* | 9/2018 | Murakami | G06F 40/51 |
| 2018/0300317 | A1* | 10/2018 | Bradbury | G06F 40/211 |
| 2018/0329897 | A1* | 11/2018 | Kalchbrenner | G06N 3/0472 |
| 2018/0336198 | A1* | 11/2018 | Zhong | G06F 16/24522 |
| 2019/0362020 | A1* | 11/2019 | Paulus | G06N 3/006 |
| 2020/0126533 | A1* | 4/2020 | Doyle | G10L 15/1815 |
| 2020/0175963 | A1* | 6/2020 | Aleksic | G10L 15/063 |
| 2021/0042475 | A1* | 2/2021 | Zhang | G06F 40/44 |
| 2021/0097144 | A1* | 4/2021 | Bapna | G06F 40/42 |
| 2021/0209315 | A1* | 7/2021 | Jia | G10L 13/00 |
| 2021/0264111 | A1* | 8/2021 | Aditya | G06N 3/08 |

OTHER PUBLICATIONS

Sutskever et al, "Sequence to Sequence Learning with Neural Networks" arXiv, Dec. 2014, 9 pages.

Vaswani et al, "Attention Is All You Need" arXiv, Dec. 2017, 15 pages.

* cited by examiner

NEURAL MACHINE TRANSLATION ADAPTATION

BACKGROUND

This specification relates to neural machine translation (NMT) systems. A neural machine translation system is one that includes any neural network that maps a source sentence in one natural language to a target sentence in a different natural language.

Even though continued research has led to the development of new network architectures and training techniques, current NMT systems struggle to translate rare words, idioms and phrases. Often NMT systems perform poorly across multiple topic domains.

SUMMARY

This specification describes a neural machine translation (NMT) system that uses a condition source target memory (CSTM) to generate a predicted translation of a source sentence from a first language to a second language. Further, the NMT may utilize a gating operation to combine information from a source encoding of the source sentence and the CSTM when generating the predicted translation of the source sentence from the first language to the second language.

In general, one innovative aspect of the subject matter described in this specification can be embodied in methods that include the actions of receiving, by a computer system, a source n-gram in a first language; determining, by the computer system, and based on the source n-gram, a set of similar n-grams, wherein each similar n-gram in the set of similar n-grams is a n-gram that is determined to be similar to the source n-gram based on the source n-gram and the similar n-gram meeting a similarity criterion, and each similar n-gram is in the first language; determining, by the computer system, for each n-gram in the set of similar n-grams, a target n-gram, wherein the target n-gram for the similar n-gram is in a second language that is different from the first language, and is a translation of the similar n-gram in the first language to the target n-gram in the second language; generating, by computer system: a source encoding of the source n-gram, wherein the source encoding is a representation of the source n-gram in the first language, for each target n-gram determined from the set of similar n-grams determined for the source n-gram, a target encoding of the target n-gram, wherein the target encoding is a representation of the target n-gram in the second language, and a conditional source target memory that is an encoding of each of the target encodings; providing, as input to a first prediction model, the source encoding and the condition source target memory; and generating, based, in part on the output of the first prediction model, a predicted translation of the source n-gram from the first language to the second language. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. In some implementations, a n-gram level retrieval approach relies on local phrase level similarities, allowing us to retrieve neighbors that are useful for translation even when overall sentence similarity is low. This can be complemented with an expressive neural network, allowing the NMT model to extract information from noisy retrieved context. A semiparametric nature of the process allows for non-parametric domain adaptation, demonstrating strong inference-time adaptation performance on new domains without the need for any parameter updates. The NMT system utilizing the CSTM exhibits improved performance of rare word and idiom processing relative to NMT systems that do not utilize the CSTM. The techniques described in this specification are applicable to any NMT systems.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

This specification describes a neural machine translation (NMT) system that uses a conditional source target memory (CSTM) to generate a predicted translation of a source n-gram from a first language to a second language. Further, the NMT may utilize a gating operation to combine information from a source encoding of the source n-gram and the CSTM when generating the predicted translation of the source n-gram from the first language to the second language.

While the examples described below are in the context of sentences, the neural NMT system may process n-grams instead of complete sentences. Thus, the NMT system is not limited to being applied to only sentences.

In operation, a source sentence in a first language is provided to a context retrieval process to retrieve target sentences in a second language. In one implementation, the context retrieval process determines, based on the source sentence and a data source, a set of similar sentences in the first language. For each similar sentence in the set of similar sentences, the context retrieval process determines a similar target sentence in the second language. The similar target sentence is a translation of the similar sentence in the first language to the second language.

In some implementations, the context retrieval process uses training data as the data source that contains sentences in first language and the corresponding translations in the second language, however the data source could be any data that has sentences in first language and for each sentence in first language, a plurality of translations in the second language. In some implementations, the data source could be any trained machine learning model which can be used to translate sentences from the first language to the second language.

A CSTM generator then processes the source sentence and the target sentences to generate a CSTM. The CSTM is a data structure that provides contextual information of the target sentences in the second language that are similar to the source sentence. In one implementation, the CSTM generator generates a source encoding of the source sentence and, for each similar target sentence, a target encoding of the similar target sentence based in part on the source encoding of the source sentence. Each encoding of a sentence is a representation of the sentence for the NMT. The CSTM generator then generates the CSTM as an encoding of each target encoding.

The source sentence and the CSTM are then used to generate a target prediction, which is a predicted translation of the source sentence from the first language to the second language. In one implementation, to generate the target prediction, the source encoding and the CSTM are provided to an NMT that utilizes a gating mechanism that combines context information from the source encoding and the CSTM. These features and additional features are described in more detail below.

Figure 1A:
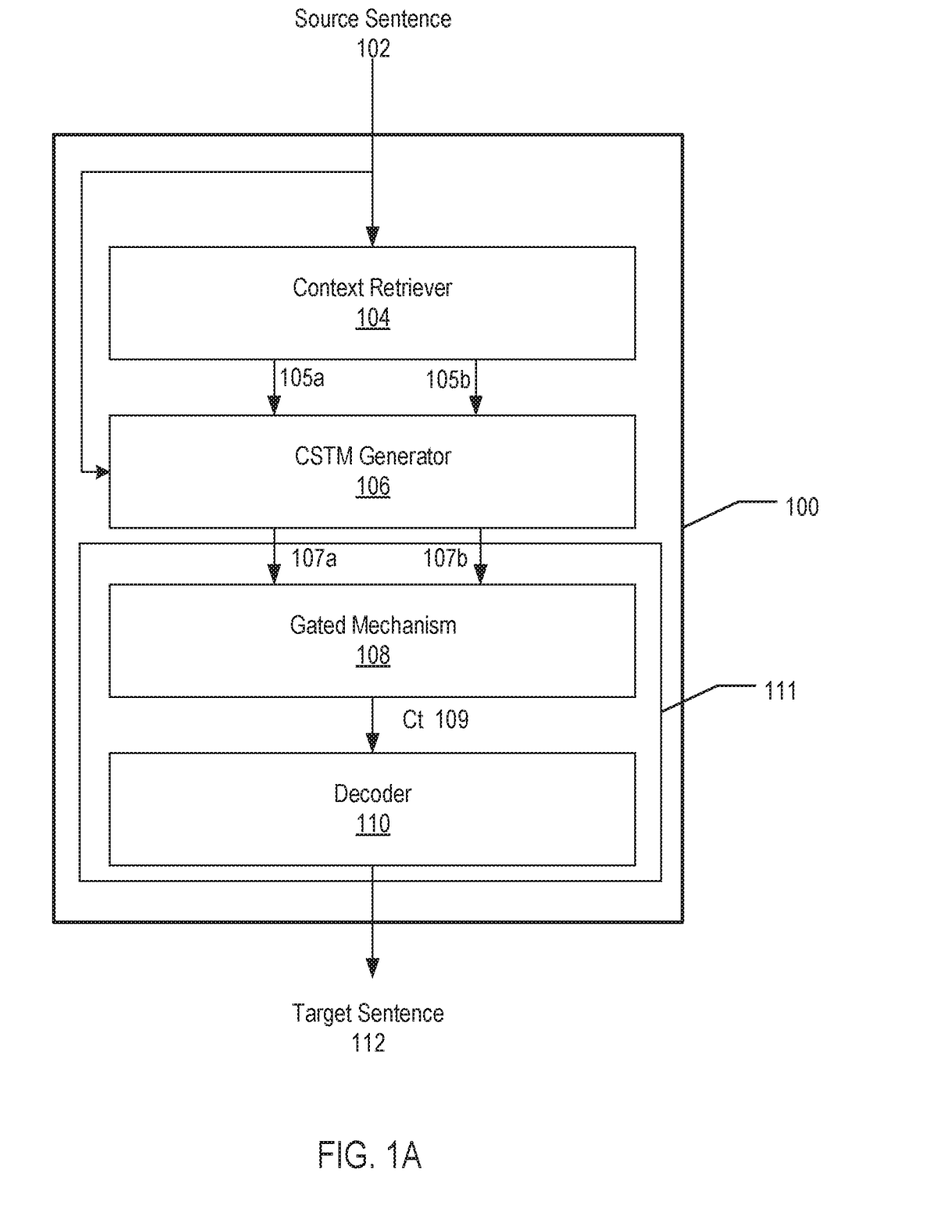
FIG. 1A is a system diagram of an example neural machine translation (NMT) system using the conditional source target memory (CSTM).

FIG. 1A shows an example NMT system 100. The NMT system 100 generates a target sentence 112 in second language from the source sentence 102 in first language. The operation of FIG. 1A is described with reference to FIG. 1B, which is a flow diagram of an example process 150 for generating a target sentence in a second language from source sentence in first language.

The target sentence 112 is a translation of the source sentence 102 from the first language to the second language. In some cases, the source sentence 102 and target sentence 112 are representation of the corresponding sentences obtained from any embedding algorithm.

Figure 1B:
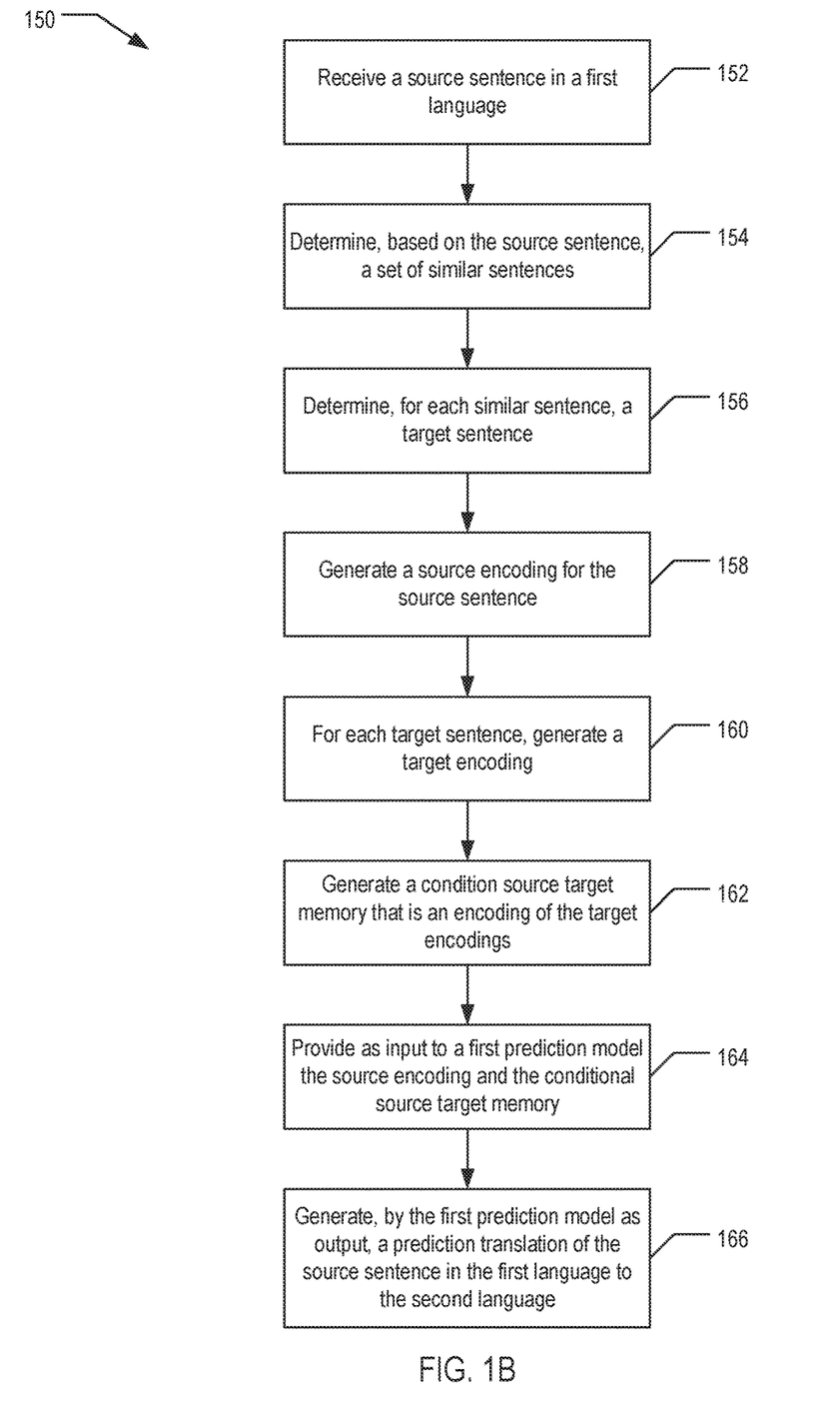
FIG. 1B is a flow diagram of an example process for generating a target sentence in a second language from source sentence in first language.

The process 150 receives a source sentence in a first language (152). For example, the context retriever 104 receives as input the source sentence 102.

The process 150 generates, based on the source sentence, a set of similar sentences (154). Each similar sentence 105a in the set of similar sentences is a sentence that is determined to be similar to the source sentence based on the source sentence and the similar sentence meeting a similarity criterion, and each similar sentence is in the first language.

The process 150 then generates, for each similar sentence, a target sentence (156). The target sentence 105b for the similar sentence is in a second language that is different from the first language, and is a translation of the similar sentence in the first language to the target sentence in the second language.

In some implementations, the context retrieval process 104 uses the NMT training data to find the set of similar sentences. In other implementations, a pre-trained NMT can be used to generate the similar target sentences from similar sentences.

In some implementations, the method of determining similarity between the source sentence 102 and the set of sentences to generate a set of similar sentence 105a is based on an n-gram similarity metric. In order to generate the set of similar sentence, the source sentence 102 and each sentence in first language is represented by a reduced n-gram representation. A similarity score that measures the similarity of the reduced source sentence and the reduced n-gram representation of the sentences is used to select the set of similar sentences. Other implementations may include complete sentence level similarity.

The process 150 generates a source encoding for the source sentence (158) and for each target sentence, a target encoding (160). The source encoding is a representation of the source sentence in the first language, and the target encoding is a representation of the target sentence in the second language. For example, the CSTM generator 106 takes as input the source sentence 102, the set of similar sentences 105a and the set of similar target sentences 105b to generate the source encoding 107a and the target encodings.

The process 150 then takes the target encodings to generate the CSTM 107b (step 162). For example, the CSTM generator 106 generates the CSTM 107b from the target encodings. In some implementations, the CSTM 107b is a data structure that provides contextual information of the set of similar target sentences 105b in the second language that are similar to the source sentence 102.

The process 150 provides as input to a first prediction model 111 the source encoding 107a and the CSTM 107b (164). In some implementations, the prediction model 111 is a gated mechanism 108 and a decoder 110. For example, the CSTM generator provides the source encoding 107a and the CSTM 107b to the gated mechanism 108. Operation of the gated mechanism will be described in more detail below. The gated mechanism 108 generates, by combining the source encoding 107a and the CSTM 107b, a gated context vector 109 which is an encoding of the source sentence 102 and the CSTM 107b. The gated context vector 109 is provided to a decoder 110, which then generates a predicted translation of the source sentence in the first language to the second language (166).

Example Retrieval Approaches

In some implementations, an inverse document frequency (IDF) may be used to retrieve sentences. However, in other implementations, sentence neighbors that might improve translation performance need not be selected in a manner that correlates with maximizing sentence similarity. These other implementations include an IDF based n-gram retrieval, and a dense vector n-gram retrieval. Each is described below.

For the IDF based sentence retrieval, sentence similarity is based on an IDF score. The IDF score of any token, t, is defined as $f_t = \log(\|C\|/n_t)$, where $\|C\|$ is the number of sentence pairs in training corpus and $n_t$ is the number of sentences t occurs in. Let any two sentence pairs in the corpus be $(X^i; Y^i)$ and $(X^j; Y^j)$. The similarity between $(X^i; Y^i)$ and $(X^j; Y^j)$ is:

$$\text{sim}(X^i, X^j) = 2 \times \Sigma_{t \in (x^i \cap x^j)} f_t - \Sigma_{t \in (x^i \cup x^j)} f_t$$

For IDF based n-gram retrieval, the context retriever 104 retrieves neighbors which have high local, sub-sentence level overlap with the source sentence. This approach thus retrieves n-grams instead of sentences, and the similarity metric defined above for sentences is equally applicable for n-gram retrieval.

Let $X = (t^1, \ldots t^T)$ be a sentence. Then the set of all possible n-grams of X, for a given n, can be defined as:

$$S_X^n = \{(t_i, \ldots t_{i+n}) \forall 1 \leq i \leq T\}$$

In some implementations, to reduce the number of n-grams used to represent every sentence, a reduced set of n-grams for X is defined to be:

$$\hat{S}_X^n = \left\{(t_i, \ldots t_{i+n}) \forall 1 \leq i \leq \tilde{T}, i \bmod \frac{n}{2} = 1\right\}.$$

For every n-gram in $S_X^n$ the closest n-gram in the training set is found using the IDF similarity defined above. For each retrieved n-gram, the system finds the corresponding sentence (In case an n-gram is present in multiple sentences, the system can, in some implementations, choose one randomly). The set of neighbors of X is then the set of all sentences in the training corpus that contain an n-gram that maximizes the n-gram similarity with any n-gram in $S_X^n$.

In some implementations, to capture phrases of different lengths, the context retriever use multiple n-gram widths, n. In case a sentence has already been added to the retrieved set, the retriever 104 finds the next most similar sentence to avoid having duplicates. The number of neighbors retrieved for each source sentence is proportional to its length.

In still other implementations, similar source n-grams are entities from domain specific dictionaries and their translations are human curated translations or translations mined from a large corpus of documents, such as the web-based resources.

More generally, the context retriever 104 generates, based on the source sentence in the first language, a reduced source n-gram representation of the source sentence, and then for each similar sentence in first language, a corresponding reduced n-gram representation of the similar sentence. Then, for each reduced n-gram representation of each similar sentence and the reduced source n-gram representation of the source sentence, the context retriever generates a similarity score that measures the similarity of the reduced n-gram representation of the similar sentence to the reduced source n-gram representation of the source sentence, and then selects, based on the similarity scores, a subset of the similar sentences. The target sentences can also be determined based on selecting a corresponding reduced n-gram representation of the target sentence for each similar sentence in the set of similar sentences.

For the dense vector based n-gram retrieve approach, the context retriever 104 extends the n-gram retrieval strategy with dense vector based n-gram representations. The objective behind using a dense vector based approach is to incorporate information relevant to the translation task in the retrieval stage. A pre-trained transformer base encoder trained on a dataset, such as the WMT dataset, to generate sub-word level dense representations for the sentence can be used. The representation for each n-gram is now defined to be the mean of the representations of all its constituent sub-words. The context retriever 104 uses the L2 distance of n-gram representations as the retrieval criterion.

In some implementations, the context retriever 104 uses a sub-word level decomposition of sentences for dense retrieval, as compared to word-level for IDF based retrieval (i.e., n-grams are composed of sub-words instead of words). Following the approach described for IDF based n-gram retrieval, the context retriever uses multiple values of n, and removes duplicate neighbors while creating the retrieved set.

Translation with Context Retrieval

Figure 2:
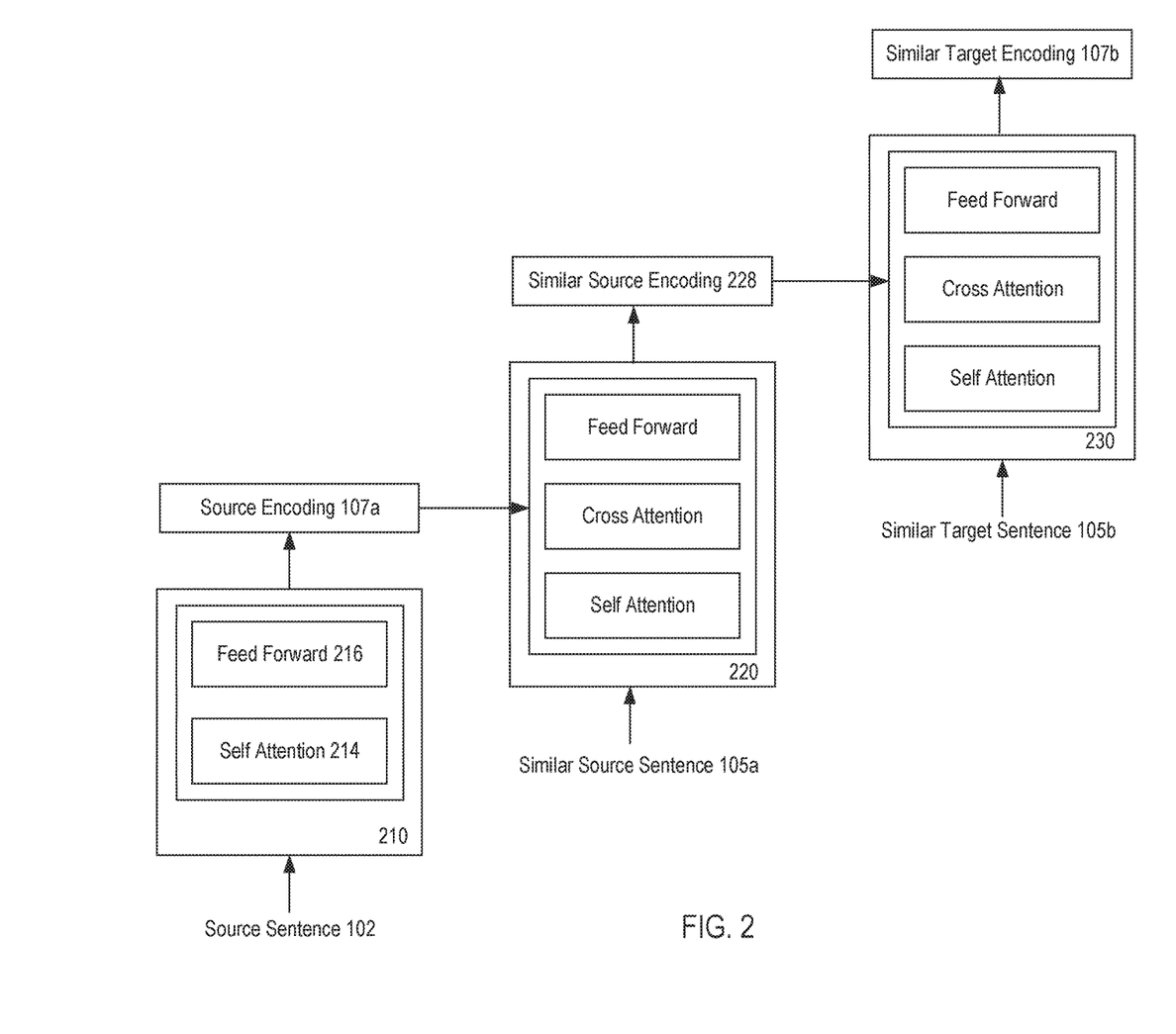
FIG. 2 is a block diagram of an example architecture of the CSTM.

FIG. 2 shows the block diagram of an example CSTM generator 106 architecture. The generator 206 includes three encoders—210, 220 and 230. The CSTM generator 106 takes as input the source sentence 102 in first language, the similar source sentence 105a in the first language and the similar target sentence 105b in the second language and generates as output, the similar target encodings 107b.

In operation, the encoder 210 is configured to receive as input the source sentence 102 in first language and generate the source sentence encoding 107a. These encodings are then provided to the encoder 220.

The encoder 220 generates similar source encoding 228 from the similar source sentence 105a and the source encoding 107a using a cross attention decoder. The similar source encodings are then provided to the encoder 230.

The encoder 230 generates the similar target encoding from the similar target sentence 105a and the similar source encoding 228 using a cross attention decoder. The similar target encoding for each similar target sentence in the set is then concatenated to form the CSTM context vector 107b.

The gating mechanism 108 in FIG. 1 generates, by combining the source encoding 107a and the CSTM 107b, a gated context vector 109 (represented by $C_t$). The gated context vector $C_t$ is thus representative of the input sentence 105 in the first language and all the similar sentences that were retrieved.

Figure 3:
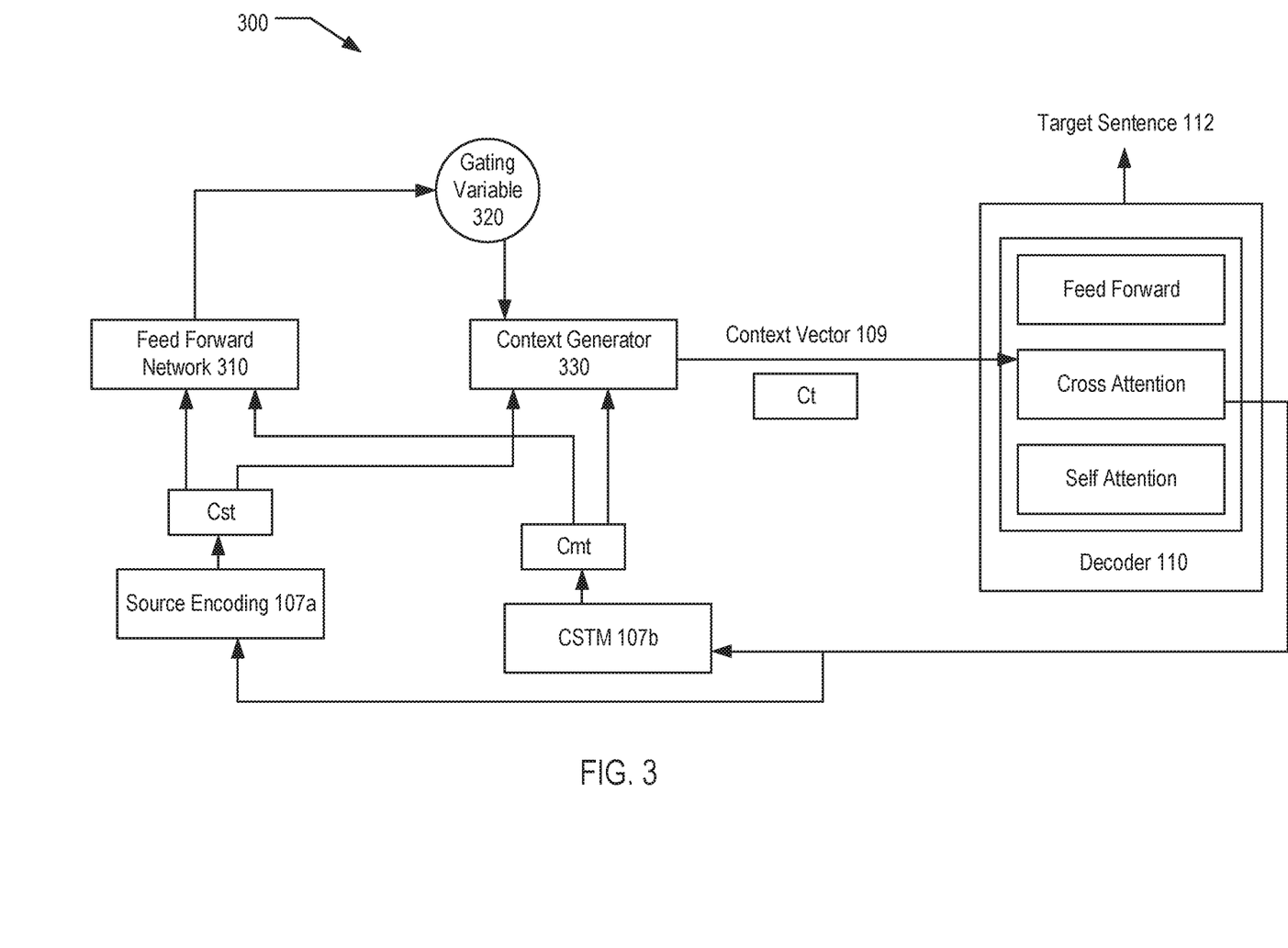
FIG. 3 is a block diagram of an example gating architecture used in the NMT.

One example gating mechanism is illustrated in FIG. 3, which is a block diagram of an example gating architecture 300 used in the NMT. In some implementations, a gated multi-source attention process is used to combine the context from the source encoder representations 107a and the CSTM 107b. As shown in FIG. 3, the source encoding 107a and the CSTM 107b at a given time t are represented by context vectors $C_{st}$ and $C_{mt}$.

In some implementations a feed forward network 310 generates, in response to the source encoding 107a and the CSTM 107b, a scalar gating variable 320, i.e., $g_t$. In an example implementation, the gating variable is given by:

$$g_t = \sigma(W_{gs} C_{st} + W_{gm} C_{mt})$$

The values of $\sigma$, $W_{gs}$ and $W_{gm}$ may be learned parameters. In other implementations, the values may be set by a system administrator. The gating variable $g_t$ is then used to generate a gated context vector $C_t$:

$$C_t = g_t * C_{st} + (1-g_t) * C_{mt}$$

Other implementations may also include incorporating attention mechanism to the source encoding 107a and CSTM 107b before proving as input to the first predictive model 310. Other implementations may comprise the gating variable be explicitly provided by the user.

The context vector 109 is provided as input to a transformer based decoder 110, generating the target sentence 112 which is the predicted translation of the source sentence from the first language to the second language.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

receiving, by a computer system, a source n-gram in a first language;

generating, for the source n-gram in the first language, a predicted translation of the source n-gram from the first language to a second language, the generating the predicted translation comprising:

determining, by the computer system, and based on the source n-gram, a set of similar n-grams, wherein each similar n-gram in the set of similar n-grams is a n-gram that is determined to be similar to the source n-gram based on the source n-gram and the similar n-gram meeting a similarity criterion, and each similar n-gram is in the first language;

determining, by the computer system, for each n-gram in the set of similar n-grams, a target n-gram, wherein the target n-gram for the similar n-gram is in the second language that is different from the first language, and is a translation of the similar n-gram in the first language to the target n-gram in the second language;

generating, by computer system:

a source encoding of the source n-gram, wherein the source encoding is a representation of the source n-gram in the first language;

for each target n-gram determined from the set of similar n-grams determined for the source n-gram, a target encoding of the target n-gram, wherein the target encoding is a representation of the target n-gram in the second language; and a conditional source target memory that is an encoding of each of the target encodings;

providing, as input to a first prediction model, the source encoding and the condition source target memory; and generating, based, in part on the output of the first prediction model, the predicted translation of the source n-gram from the first language to the second language.

2. The method of claim 1, wherein each source n-gram is a source sentence, each similar n-gram is a similar sentence, and each target n-gram is a target sentence.

3. The method of claim 2, wherein generating the predicted translation of the source sentence from the first language to the second language based in part on the output of the first prediction model comprises:

generating, by the first prediction model in response to the input of the source encoding and the condition source target memory, a scalar gating variable;

generating, based on scalar gating variable and source encoding and the conditional source target memory, a context vector;

providing, as input to a second prediction model, the gated context vector; and generating, by the second prediction model, the predicted translation of the source sentence from the first language to the second language.

4. The method of claim 3, wherein the first prediction model and the second prediction model are respective first and second neural networks.

5. The method of claim 3, wherein determining the scaler gating variable comprises: generating, by the first prediction model in response to the input of source encoding and the conditional source target memory, an output of the first prediction model;

generating, by passing the output of the first prediction model through a sigmoid function, the scaler gating variable.

6. The method of claim 3, wherein determining the context vector comprises:

generating, as a product of the scaler gating variable and source encoding, a first product;

generating, as a product of the conditional source target memory and the scaler gating variable subtracted from unity, a second product;

generating, as a sum of the first and the second product, the context vector.

7. The method of claim 2, wherein determining, by the computer system, a set of similar sentences, comprises:

generating, based on the source sentence in the first language, a reduced source n-gram representation of the source sentence;

generating, for each similar sentence in first language, a corresponding reduced n-gram representation of the similar sentence;

for each reduced n-gram representation of each similar sentence and the reduced source n-gram representation of the source sentence, generating a similarity score that measures the similarity of the reduced n-gram representation of the similar sentence to the reduced source n-gram representation of the source sentence;

selecting, based on the similarity scores, a subset of the similar sentences.

8. The method of claim 7, wherein determining the target sentence comprises:

for each similar sentence is the subset of similar sentences, selecting a corresponding reduced n-gram representation of the target sentence.

9. The method of claim 7, wherein the similarity between the reduced source n-gram representation of the sentence and a reduced n-gram representation of a similar sentence is based on an inverse document frequency measure.

10. A system, comprising:

a data processing apparatus including one or more computers; and a non-transitory computer readable storage medium storing instructions that upon execution by the data processing apparatus cause the data processing apparatus to perform operations comprising:

receiving, by a computer system, a source n-gram in a first language;

generating, for the source n-gram in the first language, a predicted translation of the source n-gram from the first language to a second language, the generating the predicted translation comprising:

determining, by the computer system, and based on the source n-gram, a set of similar n-grams, wherein each similar n-gram in the set of similar n-grams is a n-gram that is determined to be similar to the source n-gram based on the source n-gram and the similar n-gram meeting a similarity criterion, and each similar n-gram is in the first language;

determining, by the computer system, for each n-gram in the set of similar n-grams, a target n-gram, wherein the target n-gram for the similar n-gram is in the second language that is different from the first language, and is a translation of the similar n-gram in the first language to the target n-gram in the second language;

generating, by computer system:

a source encoding of the source n-gram, wherein the source encoding is a representation of the source n-gram in the first language;

for each target n-gram determined from the set of similar n-grams determined for the source n-gram, a target encoding of the target n-gram, wherein the target encoding is a representation of the target n-gram in the second language; and a conditional source target memory that is an encoding of each of the target encodings;

providing, as input to a first prediction model, the source encoding and the condition source target memory; and generating, based, in part on the output of the first prediction model, the predicted translation of the source n-gram from the first language to the second language.

11. The system of claim 10, wherein each source n-gram is a source sentence, each similar n-gram is a similar sentence, and each target n-gram is a target sentence.

12. The system of claim 11, wherein generating the predicted translation of the source sentence from the first language to the second language based in part on the output of the first prediction model comprises:

generating, by the first prediction model in response to the input of the source encoding and the condition source target memory, a scalar gating variable;

generating, based on scalar gating variable and source encoding and the conditional source target memory, a context vector;

providing, as input to a second prediction model, the gated context vector; and generating, by the second prediction model, the predicted translation of the source sentence from the first language to the second language.

13. The system of claim 12, wherein the first prediction model and the second prediction model are respective first and second neural networks.

14. The system of claim 12, wherein determining the scaler gating variable comprises: generating, by the first prediction model in response to the input of source encoding and the conditional source target memory, an output of the first prediction model;

generating, by passing the output of the first prediction model through a sigmoid function, the scaler gating variable.

15. The system of claim 12, wherein determining the context vector comprises:

generating, as a product of the scaler gating variable and source encoding, a first product;

generating, as a product of the conditional source target memory and the scaler gating variable subtracted from unity, a second product;

generating, as a sum of the first and the second product, the context vector.

16. The system of claim 12, wherein determining, by the computer system, a set of similar sentences, comprises:

generating, based on the source sentence in the first language, a reduced source n-gram representation of the source sentence;

generating, for each similar sentence in first language, a corresponding reduced n-gram representation of the similar sentence;

for each reduced n-gram representation of each similar sentence and the reduced source n-gram representation of the source sentence, generating a similarity score that measures the similarity of the reduced n-gram representation of the similar sentence to the reduced source n-gram representation of the source sentence;

selecting, based on the similarity scores, a subset of the similar sentences.

17. The system of claim 16, wherein determining the target sentence comprises:

for each similar sentence is the subset of similar sentences, selecting a corresponding reduced n-gram representation of the target sentence.

18. The system of claim 16, wherein the similarity between the reduced source n-gram representation of the sentence and a reduced n-gram representation of a similar sentence is based on an inverse document frequency measure.

19. A non-transitory computer readable storage medium storing instructions that upon execution by the data processing apparatus cause the data processing apparatus to perform operations comprising:

receiving, by a computer system, a source n-gram in a first language;

generating, for the source n-gram in the first language, a predicted translation of the source n-gram from the first language to a second language, the generating the translation comprising:

determining, by the computer system, and based on the source n-gram, a set of similar n-grams, wherein each similar n-gram in the set of similar n-grams is a n-gram that is determined to be similar to the source n-gram based on the source n-gram and the similar n-gram meeting a similarity criterion, and each similar n-gram is in the first language;

determining, by the computer system, for each n-gram in the set of similar n-grams, a target n-gram, wherein the target n-gram for the similar n-gram is in the second language that is different from the first language, and is a translation of the similar n-gram in the first language to the target n-gram in the second language;

generating, by computer system:

a source encoding of the source n-gram, wherein the source encoding is a representation of the source n-gram in the first language;

for each target n-gram determined from the set of similar n-grams determined for the source n-gram, a target encoding of the target n-gram, wherein the target encoding is a representation of the target n-gram in the second language; and a conditional source target memory that is an encoding of each of the target encodings;

providing, as input to a first prediction model, the source encoding and the condition source target memory; and generating, based, in part on the output of the first prediction model, the predicted translation of the source n-gram from the first language to the second language.

* * * * *